United States Patent [19]
Vargas-Gutiérrez et al.

[11] Patent Number: 5,279,032
[45] Date of Patent: Jan. 18, 1994

[54] METHOD OF MANUFACTURING A GAS INJECTION ELEMENT

[75] Inventors: Gregorio Vargas-Gutiérrez; Carlos Maroto-Cabrera; Andrés Geronimo-Torres, all of Saltillo, Mexico

[73] Assignee: Corporation Mexicano de Investigacion en Materiales, S.A. DE C.V., Mexico

[21] Appl. No.: 924,954

[22] Filed: Aug. 5, 1992

[51] Int. Cl.$^5$ .............................................. B23P 15/00
[52] U.S. Cl. ........................... 29/890.02; 29/890.142
[58] Field of Search .................... 29/890.02, 890.142, 29/428; 264/66; 266/270

[56] References Cited

U.S. PATENT DOCUMENTS

| | | | |
|---|---|---|---|
| 1,634,274 | 7/1927 | Smith | 29/890.02 |
| 1,646,602 | 10/1927 | Smith | 29/890.02 |
| 3,394,445 | 7/1968 | Valyi | 29/890.02 |
| 3,477,112 | 11/1969 | Yerkins | 29/890.02 |
| 4,754,954 | 7/1988 | Navano et al. | 29/890.02 |
| 4,768,267 | 9/1988 | Burbach et al. | 29/890.02 |
| 4,843,692 | 7/1989 | Hemmat | 20/890.142 |

FOREIGN PATENT DOCUMENTS

| | | | |
|---|---|---|---|
| 4023985 | 2/1991 | Fed. Rep. of Germany | 29/890.142 |
| 0709375 | 1/1980 | U.S.S.R. | 29/890.142 |

*Primary Examiner*—Irene Cuda
*Attorney, Agent, or Firm*—Laurence R. Brown

[57] ABSTRACT

A method for producing a weak resistance injection element for introducing gases into molten metals.

The injection element includes an assembly of at least two high density refractory components. At least the upper high density refractory component is made by isostatic pressing of ceramic powders followed by a double heat treating process which are selected according to the liquid metal to be melted/refined in the metallurgical vessel where the injection element is going to operate.

7 Claims, 1 Drawing Sheet

5,279,032

METHOD OF MANUFACTURING A GAS INJECTION ELEMENT

BACKGROUND OF THE INVENTION

In pneumatic metallurgy, the injection elements play an important role in the melting and refining operations.

There are several designs and arrangements for gas injection devices from single pipe tuyeres up to sophisticated combinations of metallic and ceramic components.

The main objective of these devices is to deliver predeterminated gas flow rates with the minimum vessel refractory wear.

High performance has been observed in devices manufactured from a metallic tuyere contained in a high density refractory component, withstanding better the erosion at the hot face of the injection element.

Good results have been obtained manufacturing the refractory components by isostatic pressing of ceramic powders followed by a sintering thermal cycle.

The main problem to solve has been to maintain the same mechanical properties on each point in the complete refractory component.

Anisotropy is always present and the higher anisotropy is observed with higher length/diameter ratio.

On the other hand, it has been observed in the case of interchangeable elements that the upper part of the injection elements, should be wear resistant. Properties on the rest of the refractory element should be oriented toward lower electrical and thermal conductivity and having high thermal shock resistance which is the property that controls the high performance of the injection elements.

SUMMARY OF THE INVENTION

It is therefore the object of the present invention to provide an injection element composed by a metallic tuyere contained in a high density refractory body, having high wear resistance which is due to a high mechanical isotropy and to a double firing cycle.

The high density refractor body is composed of at least two pieces. The upper piece is provided to withstand high wear conditions and thermal shock resistance. These properties are mainly achieved by a double heat treating process. The lower piece, depending on the total length of the injection element, is provided for higher thermal shock resistance and lower electrical and thermal conductivity.

The object of having several refractory components composing the injection element is to reduce the length-/diameter ratio on the piece which is produced by isostatic pressing and a double heat treating process obtaining superior resistance properties with a lower anisotropy level.

The assembly formed by at least two pieces of a refractory body is contained in a metallic can covering the complete length except the upper 4 to 6 inches.

At the lower end of the injection element, means provided to connect the gas line and to extract the injection element.

BRIEF DESCRIPTION OF THE DRAWING

FIG. #1, is a perspective view, partially broken away, of an injection element in the preferred embodiment and in accordance with the present invention.

DESCRIPTION OF THE PREFERRED EMBODIMENTS

Figure 1:
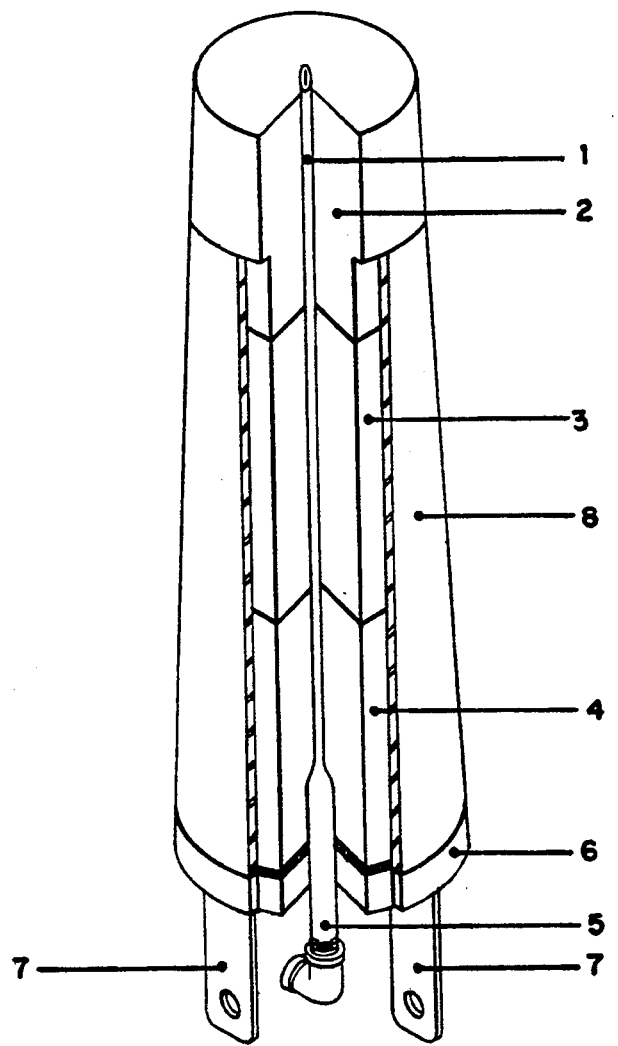

Referring to the drawing in FIG. 1, the injection element is composed of at least two refractory components: The upper component (2) and the bottom refractory component (4). Depending on the thickness of the bottom refractory lining of the furnace, one extra refractory component (3) is added.

Each refractory component has a truncated conical shape and the complete assembly of the refractory components forms a refractory body having also a truncated conical shape. At least the upper refractory component (2) is manufactured by isostatic pressing from ceramic powders followed by a double heat treatment which is selected according to the metal alloy that is melted/refined in the metallurgical vessel where the injection element is going to operate. For example, if the metallurgical vessel is an electric arc furnace for producing stainless steel, the upper refractory component (2) is manufactured as follows:

A mixture of magnesite, chromite and appropriate additives are isostatitally pressed, then a double heat treatment is conducted. The first treatment conducted between 1700°-1800° C. in oxidizing conditions and the second treatment is conducted between 1650°-1850° C. under reducing conditions.

The above procedure can also be followed for injection elements to be used in metallurgical vessels for melting or refining non ferrous alloys or high alloy steels.

In the case of vessels for melting/refining carbon steels, the upper refractory component is manufactured as follows:

Isostatic pressing of magnesite and carbon plus appropriate additives, followed by a heat treatment, namely a first heat treatment conducted at 200°-300° C. in oxidizing conditions, and the second heat treatment conducted between 900°-1100° C. under reducing conditions.

In the center of the complete assembly a hole is provided for installation of a metallic tuyere (1) wherein the hole has the same external dimension as the metallic tuyere. The said metallic tuyere is designed according to the gas flow rate to be delivered. The preferred embodiment is a tuyere that is a flattened pipe having in the lower end means to connect a gas line (5). Other embodiments consist of a single pipe or at least two concentric pipes having a controlled annular gap distance between the inner and outer diameters of adjacent pipes.

A metallic can (8) is provided to support the complete assembly leaving the upper 4-6 inches in length without cover.

In order to make interchangeable the injection element a pair of metallic lugs (7) has been provided. Said lugs are welded to the metallic can (8) and the complete metallic assembly facilitates the extraction and installation of the injection element in a refractory block assembly not shown in the drawing. The refractory blocks have an internal hole with a truncated conical shape with the outer dimensions the same as the injection element.

Although the present invention has been described, it is to be understood that modifications and variations may be resorted to, without departing from he spirit of the invention. Such medications and variations are con-

What is claimed is:

1. A method of producing a wear resistance injection element for introducing gases into molten metals, including the steps of:
   a) Providing at least two high density refractory components comprising an upper component and lower component having a truncated conical shape and producing, at least the upper component, by isostatic pressing followed by a heat treating process;
   b) Forming a truncated conical element by assembling the at least two high density refractory components;
   c) Introducing a metallic tuyere in a central hole provided through each high density refractory component, wherein said hole has substantially the same external dimensions as the said metallic tuyere;
   d) Encasing said truncated conical assembly in a metallic can with a larger bottom end, leaving a tip portion of the upper component without covering and providing means for connecting a gas line to the tuyere in the bottom end; and
   e) Providing means, at the bottom end of the metallic can to extract the injection element.

2. A method as claimed in claim 1 wherein the high density refractory components are of chrome-magnesite to the used in a melting and refining process of stainless steel, high alloy steels and non ferrous conducted with a double heat treatment, the first heat treatment being conducted between 1700°-1800° C. under oxidizing conditions and the second heat treatment being conducted between 1650°-1850° C. under reducing conditions.

3. A method as claimed in claim 1 wherein the high density refractory components are of carbon-magnesite to be used in a plain carbon steel melting and refining process having a first heat treatment conducted between 200°-300° C. under oxidizing conditions and a second heat treatment conducted between 900°-1100° C. under reducing conditions.

4. A method as claimed in claim 1 wherein the metallic tuyere is selected from the shapes consisting of: flattened pipe, single pipe, and at least tow concentric pipes having a controlled annular gap distance between the inner and outer diameters of the two concentric pipes.

5. A method for producing a wear resistance injection element for introducing gases into molten metals, comprising the steps of:
   forming a truncated conical refractory injection element with a central hole by assembling at least two high density refractory components,
   introducing a metallic tuyere in the central hole to extend through the conical element,
   encasing the truncated element components in a metallic can having upper and lower ends to leave the upper end portion of the conical element uncovered,
   providing a gas line connection to the tuyere through the metallic can,
   and providing means for extracting the injection element to the lower end of said can.

6. The method of claim 5 wherein the high density refractory components are of chrome-magnesite to be used in the melting and refining process for stainless steel, high alloy steels and nonferrous metals, further comprising the steps of:
   conducting a first heat treatment between 1700°-1800° C. under oxidizing conditions, and
   conducting a second heat treatment between 1650°-1850° C. and reducing conditions.

7. The method of claim 5 wherein the high density refractory components are of carbon-magnesite to be used in carbon steel melting and refining, further comprising the steps of:
   conducting a first heat treatment between 200°-300° C. under oxidizing conditions, and
   conducting a second heat treatment between 900°-1100° C. under reducing conditions.

* * * * *